United States Patent
Katz et al.

(10) Patent No.: US 10,824,659 B2
(45) Date of Patent: Nov. 3, 2020

(54) PREDICTING THE TEMPORAL STABILITY OF ANSWERS IN A DEEP QUESTION ANSWERING SYSTEM

(71) Applicant: International Business Machines Corporation, Armonk, NY (US)

(72) Inventors: Edward G. Katz, Washington, DC (US); John A. Riendeau, Madison, WI (US); Sean T. Thatcher, Stone Ridge, VA (US); Alexander C. Tonetti, Washington, DC (US)

(73) Assignee: International Business Machines Corporation, Armonk, NY (US)

(*) Notice: Subject to any disclaimer, the term of this patent is extended or adjusted under 35 U.S.C. 154(b) by 147 days.

(21) Appl. No.: 16/114,750

(22) Filed: Aug. 28, 2018

(65) Prior Publication Data

US 2020/0073998 A1   Mar. 5, 2020

(51) Int. Cl.
*G06F 16/332* (2019.01)
*G06K 9/62* (2006.01)
(Continued)

(52) U.S. Cl.
CPC .......... *G06F 16/3329* (2019.01); *G06F 16/23* (2019.01); *G06F 16/2358* (2019.01);
(Continued)

(58) Field of Classification Search
CPC ... G06F 16/2358; G06F 16/2365; G06F 16/23
See application file for complete search history.

(56) References Cited

U.S. PATENT DOCUMENTS 7,676,520 B2   3/2010  Liu et al.
7,831,620 B2 * 11/2010  Barsness ........... G06F 16/90335
                                                              707/790
(Continued)

OTHER PUBLICATIONS

Cai, Yuanzhe et al., "Predicting Answer Quality in Q/A Social Networks: Using Temporal Features", Technical Report CSE-2011, Department of Computer Science and Engineering, University of Texas at Arlington (2011).

(Continued)

*Primary Examiner* — Samuel G Neway
(74) *Attorney, Agent, or Firm* — Diana R. Gerhardt; Jack V. Musgrove

(57) ABSTRACT

The temporal stability of an answer from a deep question answering system is predicted using a natural language classifier. A training corpus is divided into time-ordered slices having uniform granularity. A series of candidate answers to a training question is generated based on the slices, and a temporal profile for the series is identified by associating candidate answers with respective temporal intervals. The temporal profile is translated to a temporal stability value (representing a time period) using a temporal stability model. The classifier is trained using such training questions correlated with respective temporal stability values. Thereafter, when a user submits a natural language query to the deep question answering system, the query is also applied to the classifier which determines its temporal stability. The temporal stability is presented to the user with the answer to give a sense of how long the answer can be deemed reliable.

20 Claims, 6 Drawing Sheets

(51) Int. Cl.
*G06N 20/00* (2019.01)
*G06F 16/35* (2019.01)
*G06F 16/38* (2019.01)
*G06F 16/23* (2019.01)

(52) U.S. Cl.
CPC .......... *G06F 16/2365* (2019.01); *G06F 16/35* (2019.01); *G06F 16/38* (2019.01); *G06K 9/6256* (2013.01); *G06N 20/00* (2019.01)

(56) References Cited

U.S. PATENT DOCUMENTS

| | | | |
|---|---|---|---|
| 8,156,111 B2 | 4/2012 | Jones et al. | |
| 9,646,247 B2 | 5/2017 | Bufe et al. | |
| 9,785,684 B2 | 10/2017 | Allen et al. | |
| 10,152,534 B2* | 12/2018 | Bastide | G06F 16/3329 |
| 2013/0173608 A1 | 7/2013 | Sidhu et al. | |
| 2015/0193682 A1* | 7/2015 | Baughman | G06F 16/243 707/728 |
| 2015/0293917 A1 | 10/2015 | Bufe et al. | |
| 2015/0356203 A1* | 12/2015 | Allen | G06F 40/279 707/725 |
| 2016/0034457 A1* | 2/2016 | Bradley | G06F 16/24522 707/749 |
| 2016/0147757 A1 | 5/2016 | Adderly et al. | |
| 2016/0196299 A1 | 7/2016 | Allen et al. | |
| 2016/0335323 A1* | 11/2016 | Teodorescu | G06F 11/1464 |
| 2020/0073998 A1* | 3/2020 | Katz | G06N 20/00 |

OTHER PUBLICATIONS

Anonymous, "Explaining why question-and-answer system answers change over time by listing the most relevant changes to the question-and-answer system", ip.com, disclosure No. IPCOM000234018D (2014).

Anonymous, "Method and System to Enhance Domain Knowledge from Historical Data", ip.com, disclosure No. IPCOM000236591D (2014).

Anonymous, "A method of finding historical answers to questions in a QA system", ip.com, disclosure No. IPCOM000242183D (2015).

Kogan, Shimon, et al., "Predicting Risk from Financial Reports with Regression", Human Language Technologies Annual Conf. North American Chapter of ACL, pp. 272-280 (2009).

Pal, Aditya, et al., "Question Temporality: Identification and Uses", Proc. ACM Conf. on Computer Supported Cooperative Work, pp. 257-260 (2012).

Saquete, Estela, et al., "Enhancing QA Systems with Complex Temporal Question Processing Capabilities", J. Artificial Intelligence Research. v. 35, pp. 775-811 (2009).

\* cited by examiner

PREDICTING THE TEMPORAL STABILITY OF ANSWERS IN A DEEP QUESTION ANSWERING SYSTEM

BACKGROUND OF THE INVENTION

Field of the Invention

The present invention generally relates to cognitive systems, and more particularly to a method of characterizing the stability of an answer from a deep question answering system.

Description of the Related Art

As interactions between users and computer systems become more complex, it becomes increasingly important to provide a more intuitive interface for a user to issue commands and queries to a computer system. As part of this effort, many systems employ some form of natural language processing. Natural language processing (NLP) is a field of computer science, artificial intelligence, and linguistics concerned with the interactions between computers and human (natural) languages. Many challenges in NLP involve natural language understanding, that is, enabling computers to derive meaning from human or natural language input, and others involve natural language generation allowing computers to respond in a manner familiar to a user. For example, a non-technical person may input a natural language question to a computer system, and the system intelligence can provide a natural language answer which the user can hopefully understand. Examples of an advanced computer systems that use natural language processing include virtual assistants, Internet search engines, and deep question answering systems such as the Watson™ cognitive technology marketed by International Business Machines Corp.

A cognitive system (sometimes referred to as deep learning, deep thought, or deep question answering) is a form of artificial intelligence that uses machine learning and problem solving. Cognitive systems often employ neural networks although alternative designs exist. Cognitive systems can rely on existing documents (corpora) and analyze them in various ways in order to extract answers relevant to a query, such as person, location, organization, and particular objects, or identify positive and negative sentiment. Different techniques can be used to analyze natural language, identify sources, find and generate hypotheses, find and score evidence, and merge and rank hypotheses. Models for scoring and ranking the answer can be trained on the basis of large sets of question (input) and answer (output) pairs. The more algorithms that find the same answer independently, the more likely that answer is correct, resulting in an overall score or confidence level.

Natural language classifiers are commonly used in NLP systems to identify the type of discourse in connected text, e.g., a yes/no question, a content question, a statement, an assertion, etc. This service enables developers without a background in machine learning or statistical algorithms to create natural language interfaces for their applications. A natural language classifier (NLC) interprets the intent behind text and returns a corresponding classification with associated confidence levels. The return value can then be used to trigger a corresponding action, such as redirecting the request or answering a question. NLCs are typically tuned and tailored to short text (1000 characters or less) and can be trained to function in any domain or application. For example, the IBM Watson™ natural language classifier service applies deep learning techniques to make predictions about the best predefined classes for short sentences or phrases. Exemplary applications include responding to questions from users that would otherwise be handled by a live agent, categorizing text messages (SMS) as personal, work or promotional, classifying tweets into sets such as events, news, or opinions, and analyzing text from social media or other sources to determine whether it relates positively or negatively to an offering or service.

SUMMARY OF THE INVENTION

The present invention in at least one embodiment is generally directed to a method of predicting temporal stability of an answer from a deep question answering system to a natural language query from a user by dividing a corpus into time-ordered slices, generating a series of candidate answers to a training question based on the time-ordered slices, identifying a temporal profile for the series, computing a training temporal stability of the temporal profile using a temporal stability model, training a natural language classifier using the training question correlated with the training temporal stability, and determining the temporal stability of the answer by applying the natural language query to the natural language classifier. The answer can then be presented in conjunction with the temporal stability to the user. In the exemplary implementation the slices have a uniform temporal granularity, and the temporal stability is a numeric value representing a time period. The temporal profile can be identified by associating candidate answers with respective temporal intervals. The temporal stability model can be a mean time interval model. Training can be based on textual features of the training question.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

DESCRIPTION OF THE PREFERRED EMBODIMENT(S)

While deep question answering (QA) systems have evolved greatly to provide natural language answers to human queries, problems still remain. One complication for corpus-based natural language QA systems is that the correct answer to a natural language question can vary with time, often considerably. This outcome is primarily because the world changes with time, although there are also some cases in which something that people assumed was true changes. For example, the correct answer to the question "Who is the top-ranked male tennis player?" changes somewhat frequently.

There are a number of applications in which knowing how likely the answer to a question might change in a given interval of time would provide useful information. One way in which this information could be used is to directly inform the user of a QA system how likely they should take it that a particular question's answer has changed since the piece of information upon which it was based was generated. Another application is in calculating confidence scores for answer candidates. This approach could be used as part of the training regime for the deep QA system or as part of answer set generation.

It would, therefore, be desirable to devise a method of measuring the temporal stability of an answer, in other words for determining the likelihood of an answer to change in a given period. It would be further advantageous if the method could be applied to a wide variety of question types and domains. These and other advantages are achieved using a classifier which predicts for a given natural language question the temporal stability of the answer. In the illustrative implementation a large temporally diverse corpus is divided into consecutive time slices $C_1, C_2, \ldots, C_n$, having a particular temporal granularity (time period) T. For each training question, a candidate answer series is generated, one for each corpus time slice $C_i$. A temporal profile of the answer series for each question is identified, and a temporal stability of the temporal profile is computed using a temporal stability model. The temporal profile predictor (classifier) is then trained on the basis of the questions and extracted temporal stabilities. The invention in its various implementations thereby provides a significant improvement in the technical field of natural language processing.

Figure 1:
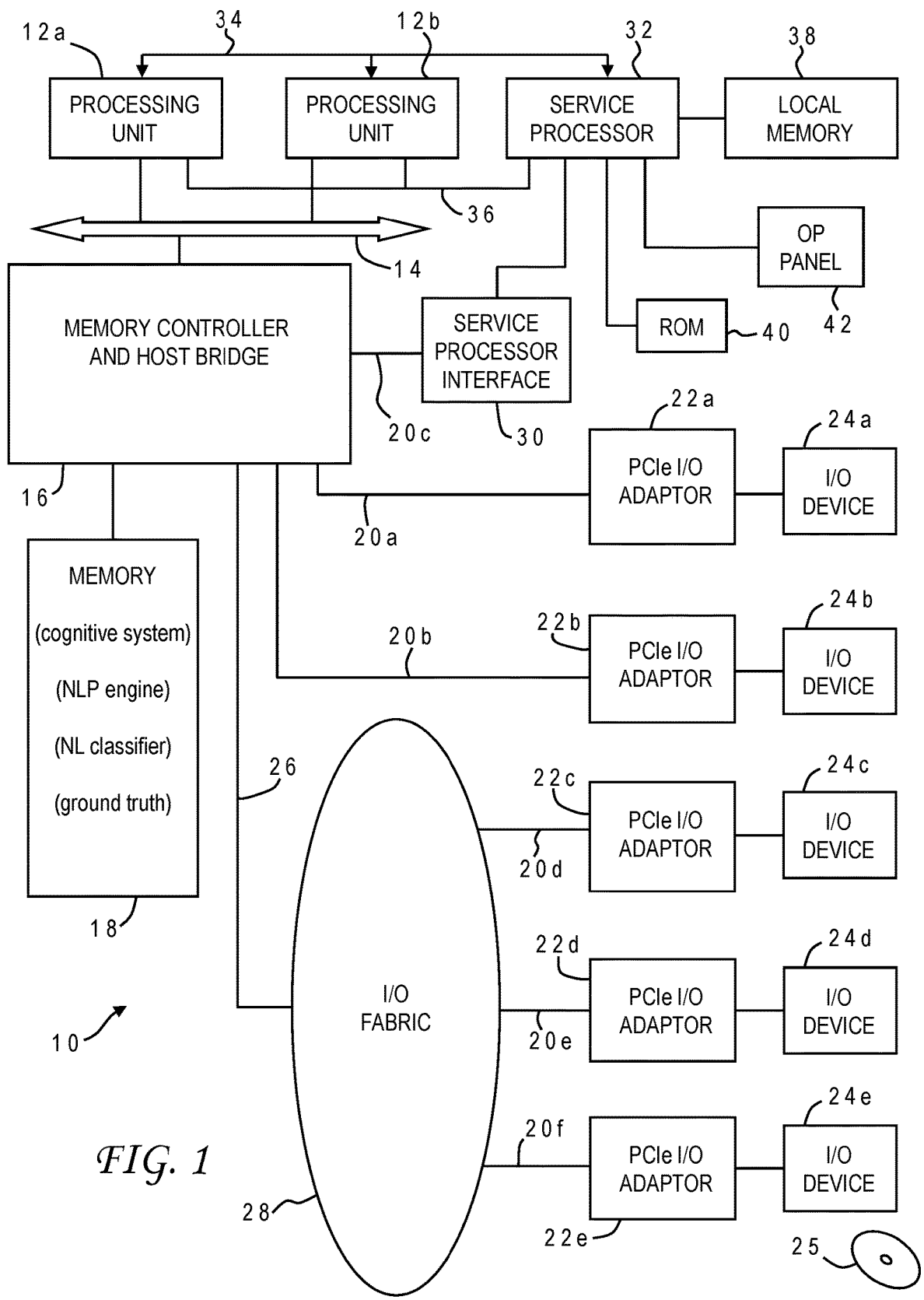
FIG. 1 is a block diagram of a computer system programmed to carry out prediction of temporal stability of an answer from a deep question answering system in accordance with one implementation of the present invention.

With reference now to the figures, and in particular with reference to FIG. 1, there is depicted one embodiment 10 of a computer system in which the present invention may be implemented to carry out the training and use of a temporal stability classifier.

Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention such as a cognitive (deep QA) system, a natural language processing engine, and the natural language classifier trained using the ground truth as taught herein.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the temporal stability predication application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a natural language classifier process that uses novel training techniques to predict the temporal stability of an answer from a deep QA system. Accordingly, a program embodying the invention may additionally include conventional aspects of various natural language processing (NLP) tools, and these details will become apparent to those skilled in the art upon reference to this disclosure.

Figure 2:
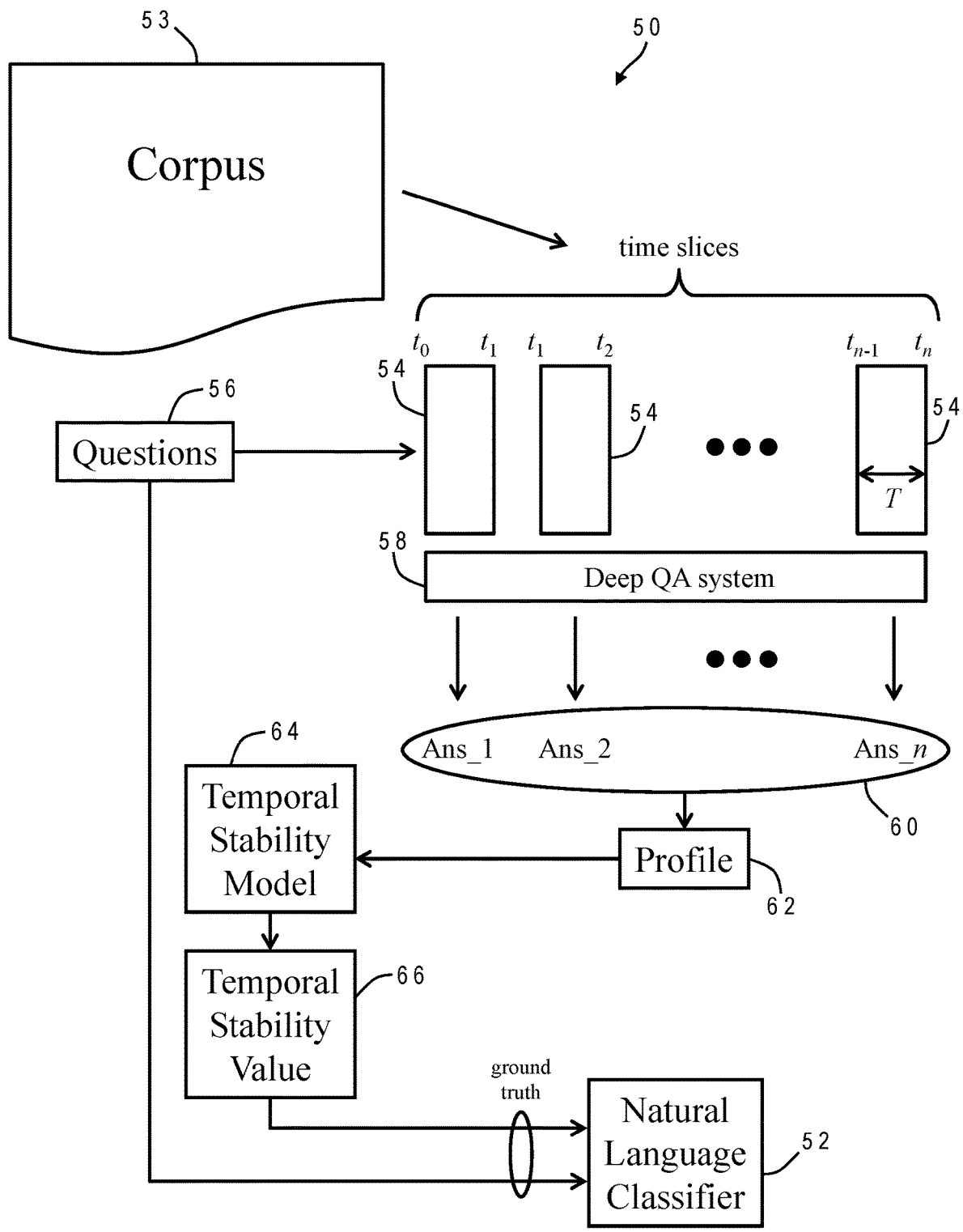
FIG. 2 is a high-level block diagram of a training environment for a natural language classifier to be used in computing the temporal stability of an answer from a deep question answering system in accordance with one implementation of the present invention.

Referring now to FIG. 2, there is depicted a training environment 50 for a natural language classifier 52 in accordance with one implementation of the present invention. Training environment 50 may instantiate in computer system 10, and includes a reference (training) corpus 53 which is broken down into a plurality of time slices 54 having a uniform granularity T. The granularity may be based on various factors including manual selection or automatic designation for a regular (periodic) publication, e.g., every day or once a month. In this implementation the time slices are contiguous, i.e., the first time slice starts at time $t_0$ and ends at time $t_1$, the second time slice starts at time $t_1$ and ends at time $t_2$, etc., but there could be breaks between time slices in other implementations. The time slices could also be overlapping; all that is required is that the slices are in time order based on some kind of time stamp. Each time slice has a plurality of sentences, phrases or other natural language statements therein forming a sort of mini-corpus.

A given question from a set of input questions 56 is applied to each time slice 54 using a deep QA system 58, generating an answer series 60, i.e., a time-ordered series of the answers Ans_1, Ans_2, . . . , Ans_n, from each corpus slice based on the same question. Answer series 60 is used to create a profile 62 according to a desired methodology as explained further below. Profile 62 is applied to a temporal stability model which may be of varying kinds as also explained further below. The result is a temporal stability value 66, i.e., a number representing a certain length of time. This value captures a sense of how long an answer for this particular question is likely to remain valid, although it is of course not determinative. The temporal stability value is paired with the particular question and fed to natural language classifier 52 as ground truth, i.e., the question is the input and the temporal stability value is the output. This process is repeated for multiple questions from the set of questions 56 to generate a large number of ground truth samples for classifier 52. Classifier 52 may be so trained using a wide variety of different corpora in different domains. Training may be accomplished using conventional methods. In one implementation training is based on the text of the question. One example of numerical prediction based on textual models is provided by Shimon Kogan et al. in "Predicting risk from financial reports with regression" (Proceedings of Human Language Technologies annual conference of the North American Chapter of the Association for Computational Linguistics. Association for Computational Linguistics, 2009).

Figure 3:
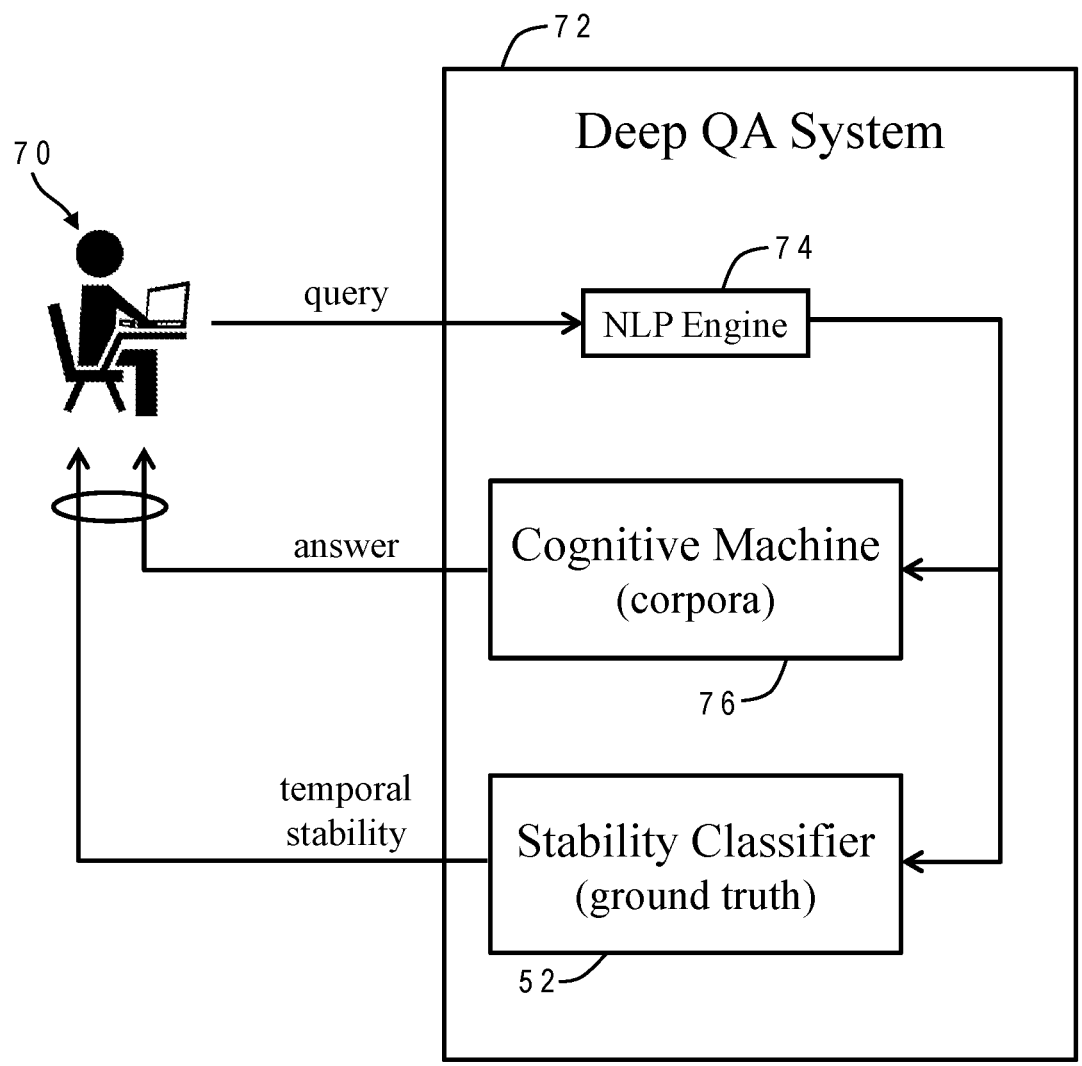
FIG. 3 is a high-level block diagram illustrating application of the invention using a cognitive system that receives a natural language query from a user in accordance with one implementation of the present invention.

Being so trained, natural language classifier 52 can now be used to predict the temporal stability of new questions submitted to a deep QA system. As seen in FIG. 3, a user 70 submits a query to another deep QA system 72 constructed in accordance with one implementation of the present invention. An NLP engine 74 is used to parse (annotate) the query based on conventional techniques, and the parsed query is then forwarded to both a cognitive machine 76 and the stability classifier 52. Cognitive machine 76 provides one or more answers also based on conventional techniques using different corpora. Stability classifier 52 determines a temporal stability value for the answer. The value may for example be a time period extracted from the ground truth table associated with an input question in the ground truth table which is determined to be most like the query, or it may be some combination of time periods extracted from the ground truth such as an average of values associated with multiple ground truth questions deemed to be similar to the query, weighted according to computed confidence scores. The temporal stability is returned to the user along with the recommended answer, allowing the user to more accurately gauge the likelihood that the answer is currently considered correct.

Figure 4:
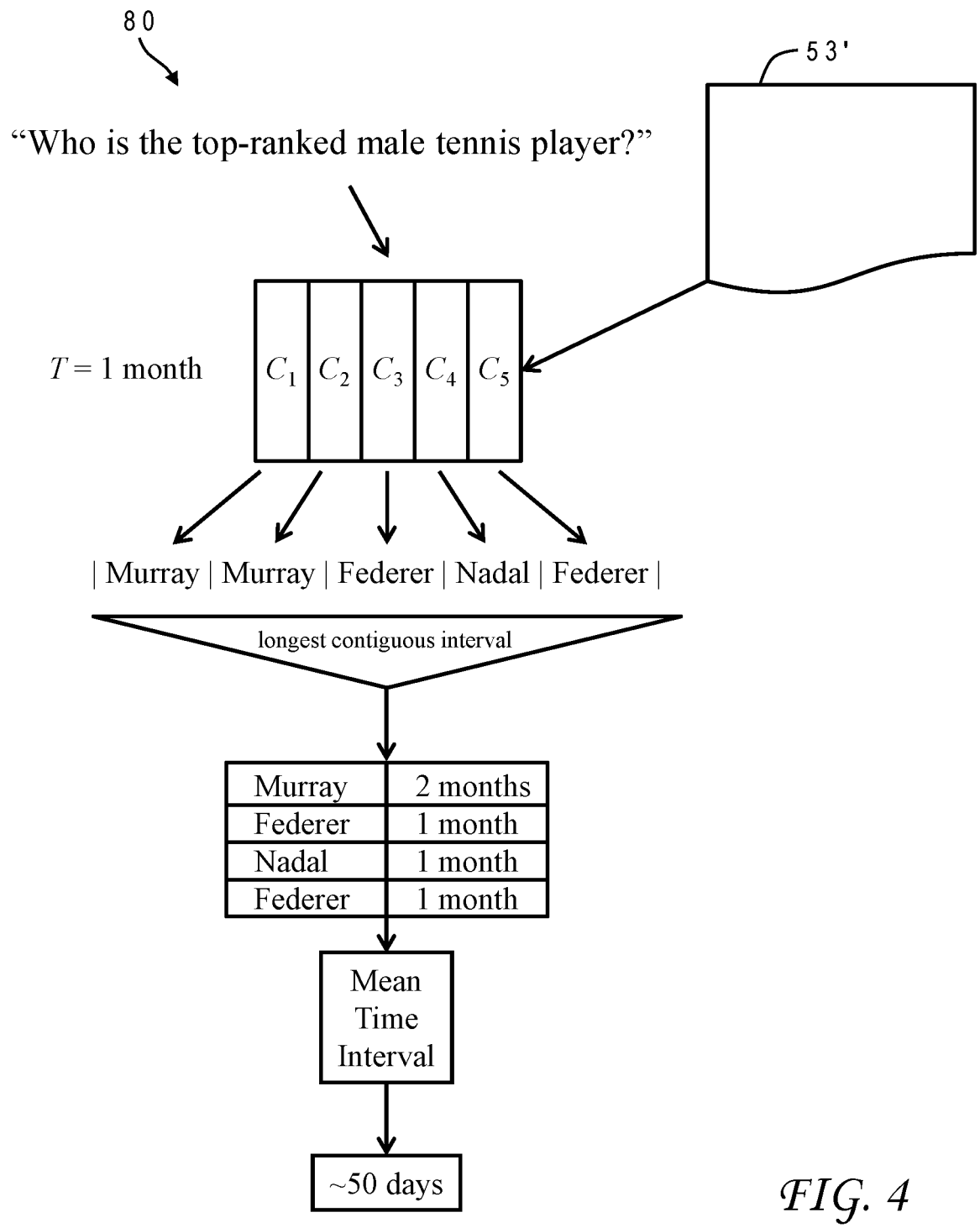
FIG. 4 is a pictorial representation of temporal stability computation for a first query example in accordance with one implementation of the present invention.

FIG. 4 is a pictorial representation of a temporal stability computation 80 for a first training example in accordance with one implementation of the present invention. In this example the training query is "Who is the top-ranked male tennis player?". A corpus 53' whose contents span a period of five months is divided into five time slices, i.e., each time slice represents one month. For example, corpus 53' might be newswire data for sports. The question is applied to each time slice. For the most recent two time slices, the answer is Murray; for the previous time slice the answer is Federer; for the next previous time slice the answer is Nadal; for the oldest time slice the answer is again Federer. A temporal profile of this answer series is then identified by associating answer candidates with temporal intervals. There are a variety of methodologies to achieve this step, the simplest being a "longest contiguous interval". According to this approach, the longest contiguous intervals are: "Murray"—2 months; "Federer"—1 month; "Nadal"—1 month; "Federer"—1 month. Another approach to identifying the temporal profile might be to use a set of weighted points in time and find an inferred distribution over them. For example the temporal profile of the answer series for "Which nation is the America's Cup holder?" might discount the long past period of a single answer and more heavily weight more recent heterogeneity of answers.

The temporal profile can then be used to compute the temporal stability according to a desired temporal stability model. Again, there are a variety of models for temporal profiles. A simple model is one that classifies each question on the basis of the mean time interval of answer candidate change. Using that model, the subject question would have a temporal stability value of approximately 50 days (three changes over five months). An alternative model would be the number of new answers per time period, e.g., day.

Figure 5:
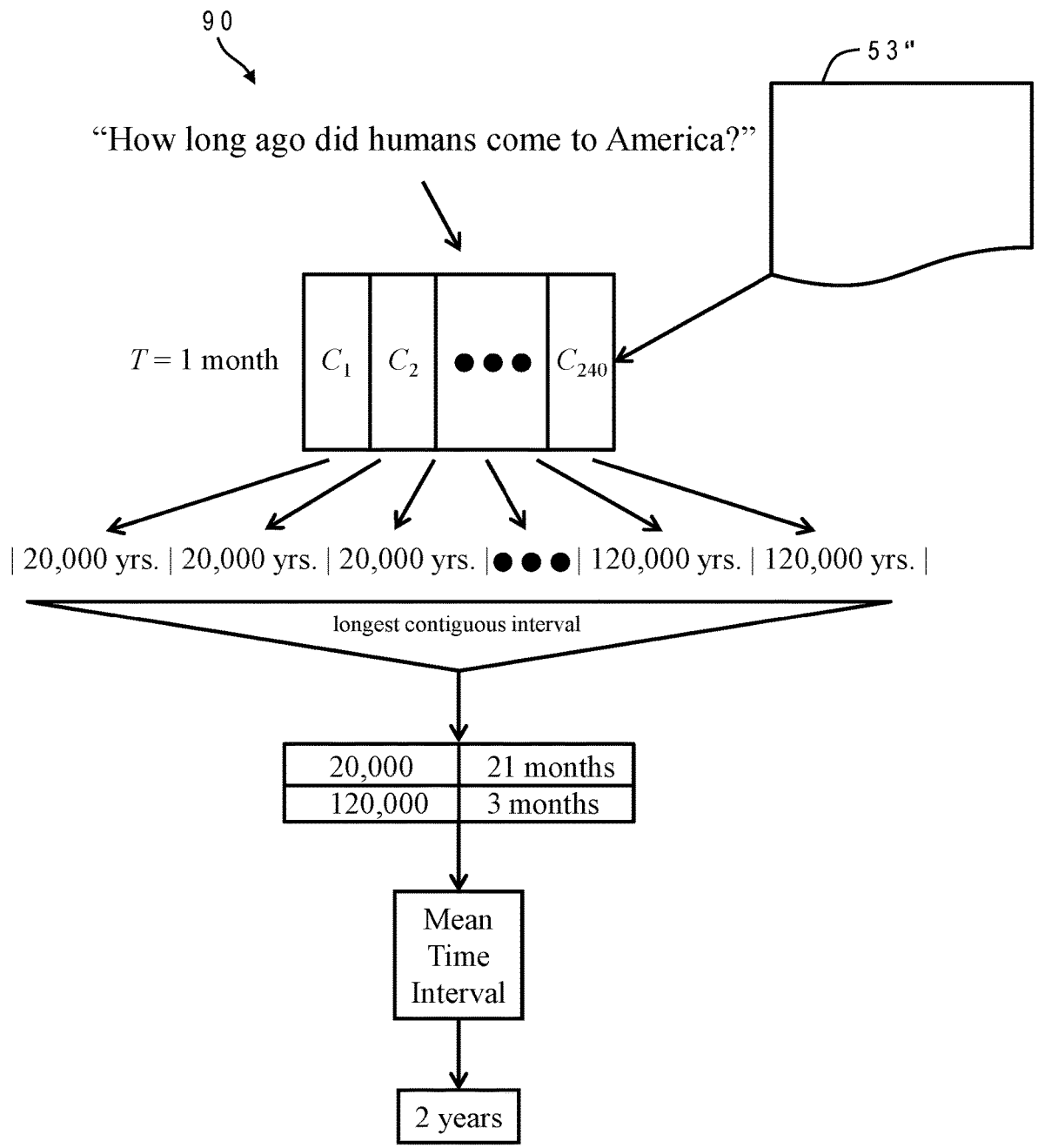
FIG. 5 is a pictorial representation of temporal stability computation for a second query example in accordance with one implementation of the present invention.

FIG. 5 shows a second example of a temporal stability computation 90 wherein the query is "How long ago did humans come to America?". Another corpus 53" whose contents span a period of two years is divided into twenty-four time slices, i.e., each time slice again represents one month. For example, corpus 53" might be an anthropological periodical. Further to this example, the most recent twenty-one time slices result in the same answer of 20,000 years, while the last three time slices result in the same answer of 130,000 years. Using the longest contiguous interval methodology, the profile becomes "20,000 years"—21 months; "130,000 years"—3 months. The mean time interval of answer candidate change results in a temporal stability value of two years (one change over two years).

The foregoing two examples use the same time slice granularity (one month) to illustrate how the temporal stability values can still differ considerably. The one-month granularity should not, however, be deemed limiting in any way as the granularity could be as little as a day (or even an hour), or as long as a decade or more. The granularity is ideally uniform but the invention could still be practiced with slices having irregular time frames.

Additionally, while the temporal stability is heretofore described as a numeric value, it could instead be a qualitative value (string). In such a case, an answer that is likely to remain correct for only a very short period of time might be labeled with a temporal stability of "volatile", "short-term", "highly variable" or the like, while an answer that is likely to remain correct for a very long period of time might be labeled as "stable", "indefinitely", "longstanding" or the like. For an answer to questions that pertain to extremely well-established (long-accepted) matters, the temporal stability might be "never changes" or "always".

Figure 6:
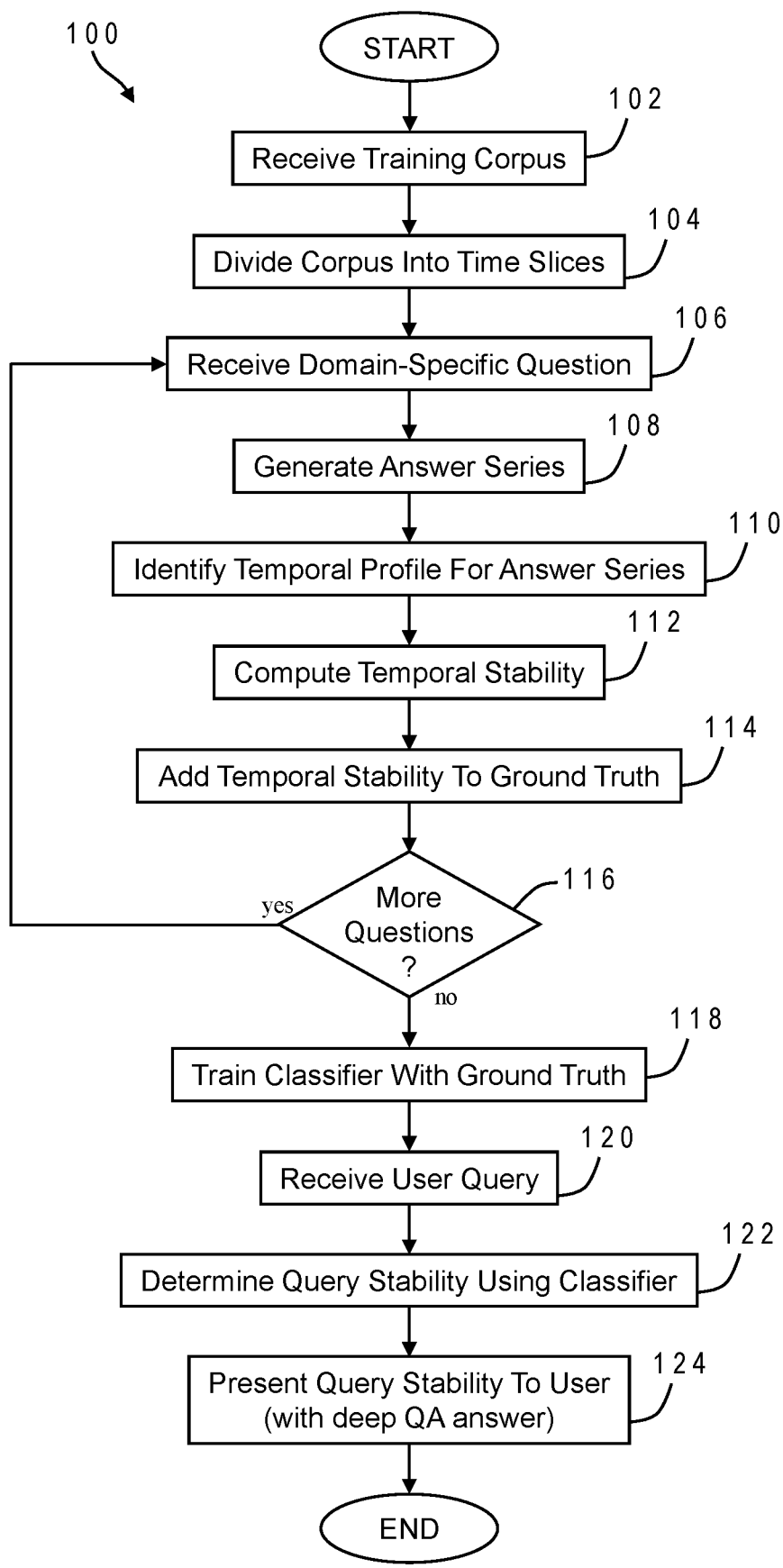
FIG. 6 is a chart illustrating the logical flow for a temporal stability classifier process in accordance with one implementation of the present invention.

The present invention may be further understood with reference to the chart of FIG. 6 which illustrates the logical flow for a temporal stability computation process 100 in accordance with the one implementation of the present invention. Process 100 may be carried out on computer system 10, and begins when the system receives a corpus to be used for training the classifier/predictor (102). The corpus is divided into a plurality of time slices (104), and a first question is provided relevant to the domain of the corpus (106). An answer series is created by applying the question to each time slice of the corpus (108). A temporal profile of the answer series is identified, e.g., using longest contiguous intervals (110). The temporal stability of the profile is computed using a model such as mean time interval of answer candidate change (112). This temporal stability is added to the ground truth in association with the question (114). If more questions are available (116), they are applied and the process returns to box 106 to continue to build the ground truth. Once so built, the ground truth is used to train the natural language classifier (118). Thereafter, when a natural language query is received from a user (120), the classifier is used to determine the temporal stability of the query (122), which is then presented to the user along with an answer from the deep QA system (124). The present invention thereby imparts a superior measure of reliance in the answer to the user.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been described with specific reference to two examples involving sports and anthropology, but it is equally applicable to other domains such as politics, economics, demographics, finance, geography, etc. It is therefore contemplated that such modifications can be made without departing from the spirit or scope of the present invention as defined in the appended claims.

What is claimed is:

1. A method of predicting a current temporal stability of an answer from a deep question answering system to a natural language query from a user comprising:
    receiving a corpus in computer-readable form, by executing first instructions in a computer system;
    receiving a training question pertaining to a domain of the corpus, by executing second instructions in the computer system;
    dividing the corpus into a plurality of time-ordered slices, by executing third instructions in the computer system;
    generating a series of candidate answers to the training question wherein each candidate answer is based on a respective one of the time-ordered slices and the candidate answers are in time order in the series, by executing fourth instructions in the computer system;
    identifying a temporal profile for the series, by executing fifth instructions in the computer system;
    computing a training temporal stability of the temporal profile using a temporal stability model, by executing sixth instructions in the computer system;
    training a natural language classifier using the training question correlated with the training temporal stability, by executing seventh instructions in the computer system; and
    determining the current temporal stability of the answer by applying the natural language query to the natural language classifier, by executing eighth instructions in the computer system.

2. The method of claim 1 wherein the slices have a uniform temporal granularity.

3. The method of claim 1 wherein the current temporal stability is a numeric value representing a time period.

4. The method of claim 1 wherein the temporal profile is identified by associating candidate answers with respective temporal intervals.

5. The method of claim 1 wherein the temporal stability model is a mean time interval model.

6. The method of claim 1 wherein said training is based on textual features of the training question.

7. The method of claim 1 further comprising presenting the answer in conjunction with the current temporal stability to the user.

8. A computer system comprising:
    one or more processors which process program instructions;
    a memory device connected to said one or more processors; and
    program instructions residing in said memory device for predicting a current temporal stability of an answer from a deep question answering system to a natural language query from a user by receiving a corpus in computer-readable form, receiving a training question pertaining to a domain of the corpus, dividing the corpus into a plurality of time-ordered slices, generating a series of candidate answers to the training question wherein each candidate answer is based on a respective one of the time-ordered slices and the candidate answers are in time order in the series, identifying a temporal profile for the series, computing a training temporal stability of the temporal profile using a temporal stability model, training a natural language classifier using the training question correlated with the training temporal stability, and determining the current temporal stability of the answer by applying the natural language query to the natural language classifier.

9. The computer system of claim 8 wherein the slices have a uniform temporal granularity.

10. The computer system of claim 8 wherein the current temporal stability is a numeric value representing a time period.

11. The computer system of claim 8 wherein the temporal profile is identified by associating candidate answers with respective temporal intervals.

12. The computer system of claim 8 wherein the temporal stability model is a mean time interval model.

13. The computer system of claim 8 wherein the training is based on textual features of the training question.

14. The computer system of claim 8 wherein said program instructions further present the answer in conjunction with the current temporal stability to the user.

15. A computer program product comprising:

a computer readable storage medium; and program instructions residing in said storage medium for predicting a current temporal stability of an answer from a deep question answering system to a natural language query from a user by receiving a corpus in computer-readable form, receiving a training question pertaining to a domain of the corpus, dividing the corpus into a plurality of time-ordered slices, generating a series of candidate answers to the training question wherein each candidate answer is based on a respective one of the time-ordered slices and the candidate answers are in time order in the series, identifying a temporal profile for the series, computing a training temporal stability of the temporal profile using a temporal stability model, training a natural language classifier using the training question correlated with the training temporal stability, and determining the current temporal stability of the answer by applying the natural language query to the natural language classifier.

16. The computer program product of claim 15 wherein the slices have a uniform temporal granularity.

17. The computer program product of claim 15 wherein the current temporal stability is a numeric value representing a time period.

18. The computer program product of claim 15 wherein the temporal profile is identified by associating candidate answers with respective temporal intervals.

19. The computer program product of claim 15 wherein the temporal stability model is a mean time interval model.

20. The computer program product of claim 15 wherein the training is based on textual features of the training question.

* * * * *